A. SAUNDERS.
Chucks for Holding Pipe-Nipples.

No. 154,345. Patented Aug. 25, 1874.

Witnesses.
Van Wyck Wickes
William B. Phair

Inventor.
Andrew Saunders
per
James A. Whitney

UNITED STATES PATENT OFFICE.

ANDREW SAUNDERS, OF YONKERS, N. Y.

IMPROVEMENT IN CHUCKS FOR HOLDING PIPE-NIPPLES.

Specification forming part of Letters Patent No. 154,345, dated August 25, 1874; application filed June 16, 1874.

*To all whom it may concern:*

Be it known that I, ANDREW SAUNDERS, of Yonkers, in the county of Westchester and State of New York, have invented an Improvement in Nipple-Chucks, of which the following is a specification:

In the manufacture of screw-nipples it is usual to first form a thread upon one end of a pipe of any convenient length, to then cut off the end portion of the pipe to provide what may be termed a blank, one end of which has already a screw-thread formed upon it, while the other requires manipulation by a tedious, slow, and imperfect operation to provide a similar thread thereon, the difficulties incident to this arising from the small length of the blank or half-formed nipple and the crude nature of the devices used in forming the second thread upon it. My invention consists in a special combination of parts constituting an improved machine, whereby the hereinbefore-indicated forming of the thread upon the smooth end of the blank may be performed with very great speed and facility, and without loss of time by stoppage of machinery, a portion of the invention, moreover, being adapted for use in making reducing bushings, so called, and similar metallic articles.

Figure 1:
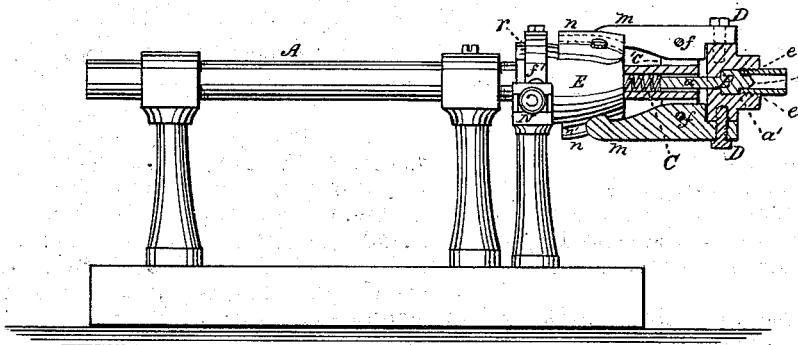
Figure 2:
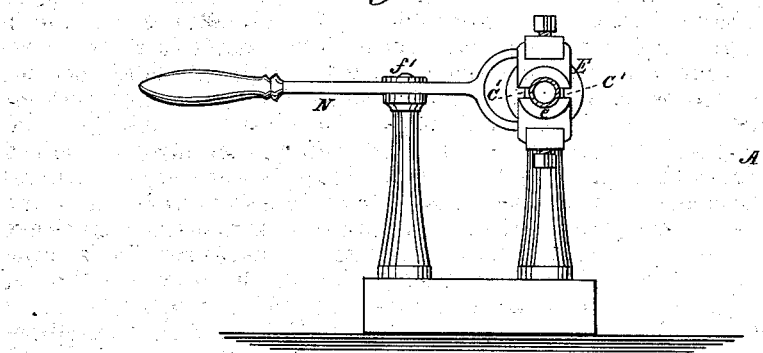
Figure 3:
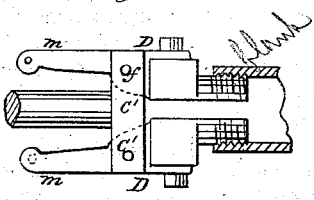

Figure 1 is a side view and partial vertical longitudinal sectional view of an apparatus constructed according to my invention. Fig. 2 is an end or front view of the same; and Fig. 3 is a side view, showing a modification of the same.

A is a shaft capable of rotation—as, for example, the mandrel of a common lathe—but the end of which is bored axially to receive the cylindrical stem $a$ of a pin, B, the outer extremity or head $b$ of which is of conical shape, as shown in Fig. 1, immediately behind the head, in an annular shoulder, $a'$. A spring, C, behind the stem $a$ renders the pin B, on occasion, capable of an elastic inward movement. At the extremity of the shaft A are two cross-bars, C', parallel with each other, and providing bearings at opposite sides of the shaft for the pivots $f$ of the jaws D. These jaws are made, preferably, with detachable portions $g$, held to the pivoted part by set-screws $i$, in order that the device may be varied for different sizes or kinds of work; but, when preferred, each jaw may be made wholly in one piece. The inner surface or face of each jaw is formed with teeth or oblique threads at $e$ in Fig. 1, the said threads corresponding in size, pitch, and general contour with the threaded end of the nipple-blank to be held thereby. Each jaw has an inwardly-extending shank or arm, $m$, which arms $m$ pass upon opposite sides of a sleeve, E, capable of a longitudinal but not a rotary movement upon the shaft A, the contiguous surfaces of the sleeve being inclined in such manner that when the sleeve is moved outward toward the jaws the latter will be compressed or brought toward each other. Fixed upon opposite sides of the aforesaid sleeve, and in suitable relation to the aforesaid arms, are radial flanges or wings $n$, longitudinal upon the sleeve and parallel to the innermost portions of the arms $m$. In one side of each wing, and at the same inclination as the adjacent inclined surfaces of the sleeve, is a groove, $n'$. Lateral studs extend from the end of each arm $m$ into the adjacent groove $n'$, so that when the sleeve is moved in a direction away from the jaws the inclined outer sides of the grooves will bring the arms $m$ inward, and consequently spread or bring apart the jaws. The longitudinal movement is given to the sleeve by a lever, N, working on a vertical pivot, $f$, and forked to straddle the sleeve, as shown in Fig. 2, each arm of its fork having an inwardly-projecting stud, fitting into an annular circumferential groove, $r$, provided in the inner end of the sleeve, so that, by moving the lever in one direction or the other, the jaws may be brought toward or from each other, as the case may be. Rotation is given to the shaft A by any suitable or appropriate means.

In using the apparatus, the blank, provided as hereinbefore set forth, is thrust with its threaded end inward, or first, and its bore coincident with the conical head of the pin B, and its squared end against the shoulder $a'$. By this means the blank is properly centered and squared to its place, with its axis practically coincident with that of the shaft A. The jaws are then brought together to gripe the threaded end of the blank between them as the obliquely-threaded surfaces of the jaws come in contact with the thread on the blank. The latter, being capable of a slight longitudinal movement permitted by the elastic or yielding character of the pin B, is enabled to adjust itself to the jaws, the teeth or threads of the latter slipping smoothly into the spaces between the threads in the blank, instead of striking rigidly upon the threads themselves, as would be likely to occur if the blank had no possibility of longitudinal self-adjustment. Thus clamped by the jaws, with its plain unfinished or unthreaded end projecting therefrom, as indicated at $m$ in Fig. 1, said end of the blank may be subjected to the action of any suitable screw-cutting mechanism, to cut or provide the screw-thread thereon, as required in the completion of the nipple. When this is accomplished the jaws are spread by a reverse movement of the lever N, and the finished nipple drops out, and, without stopping the rotation of the jaws, may be replaced by a blank to undergo the same operation, and so on in succession. When the blank has an internal instead of external thread, the jaws are modified in construction, as represented in Fig. 3, their oblique threads or teeth being formed upon their outer surfaces, so that the jaws, being thrust within the threaded ends of the blank, and expanded by the proper movement of the lever, will gripe the same from the inside, and with an outward pressure to hold it in due relation with the mechanism employed to thread the opposite or outer end of the blank to complete the work.

In the bringing to proper size and contour of plain articles, such as collars and the like, the jaws may be made with plain holding-surfaces and actuated by the mechanism set forth, and in such cases will be found to perform in a very efficient and satisfactory manner.

What I claim as my invention is—

The improved nipple-chuck formed and constituted by the expanding griping-jaws, provided upon a shaft capable of rotation, and constructed with oblique teeth corresponding to the threads of the screw-surface to be held, and concentric therewith; the sliding centering-pin, made elastic by the spring behind it, and formed with a conical head; and the sliding actuating-sleeve, provided with inclined grooves, connected with the arms $m$ of the jaws, to operate the same, the whole being combined and arranged for operation substantially as and for the purpose herein set forth.

ANDREW SAUNDERS.

Witnesses:
 THEODORE FITCH,
 WM. B. PHAIR.